United States Patent [19]

Britton

[11] Patent Number: 4,536,957
[45] Date of Patent: Aug. 27, 1985

[54] SPLITTER FOR ELECTRICAL CABLE

[76] Inventor: Walter Britton, 4713 Acorn Dr., Lakeland, Fla. 33802

[21] Appl. No.: 495,997

[22] Filed: May 19, 1983

Related U.S. Application Data

[60] Division of Ser. No. 368,272, Apr. 14, 1982, Pat. No. 4,459,745, which is a continuation-in-part of Ser. No. 271,942, Jun. 9, 1981, abandoned.

[51] Int. Cl.³ .............................................. H02G 1/12
[52] U.S. Cl. ........................................ 30/90.4; 81/9.4
[58] Field of Search ...................... 30/90.1, 90.4, 90.7, 30/90.6; 81/9.5 R, 9.5 C

[56] References Cited

U.S. PATENT DOCUMENTS

| | | | |
|---|---|---|---|
| 1,062,310 | 5/1913 | Waite | 30/90.4 |
| 1,739,972 | 12/1929 | Klinger | 30/90.4 |
| 2,452,734 | 11/1948 | Costelow | 30/90.7 X |
| 2,819,520 | 1/1958 | Eyles | 81/9.5 C |
| 3,091,031 | 5/1963 | Grant | 30/90.7 |
| 3,092,906 | 6/1963 | Deering | 30/90.6 |
| 3,238,618 | 3/1966 | Cook | 30/90.4 |
| 3,777,397 | 12/1973 | Johnson | 30/90.6 |
| 4,026,017 | 5/1977 | Arnold | 30/90.6 |
| 4,459,745 | 7/1984 | Britton | 30/90.4 |

FOREIGN PATENT DOCUMENTS 556009 7/1943 United Kingdom ................. 30/90.7

*Primary Examiner*—Jimmy C. Peters
*Attorney, Agent, or Firm*—Frijouf, Rust & Pyle

[57] ABSTRACT

A cable splitter is disclosed for splitting the outside sheath of a cable containing one or more inner conductors. The cable splitter comprises an elongated member having a trough disposed along the entire longitudinal length thereof. A handle is connected to the distal end of the elongated member. A cutting element is positioned through a boss connected to the proximal end of the elongated member such that the cutting edge of the cutting element extends into the trough. The amount by which the cutting edge extends into the trough is made adjustable by means of set screws threadably disposed through the boss to engage the cutting element. Preferably the trough comprises a cross-sectional configuration substantially identical to the cross-sectional configuration of the cable to be slit. This enables the cable splitter of this invention to slit the sheath of the cable along the edge thereof, rather than along the flat, mid-portion of the cable.

In an alternative embodiment, a first elongated member has a first trough located along the longitudinal length thereof. A second elongated member has a second trough located along the longitudinal length thereof and a beading strip which cooperates with the first trough to lock the first and second elongated members together.

A transverse channel extends through the first and second elongated members and the beading strip to guide an adjustably located cutting element such that the cutting edge of the cutting element is disposed within the second trough.

1 Claim, 15 Drawing Figures

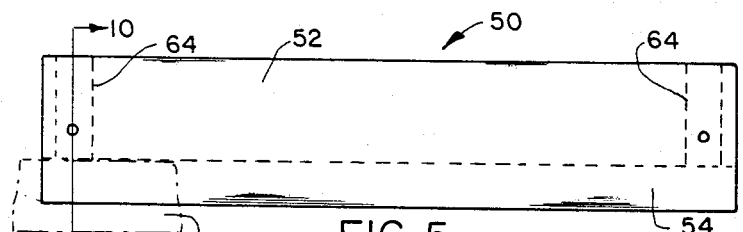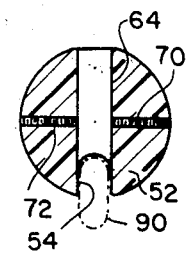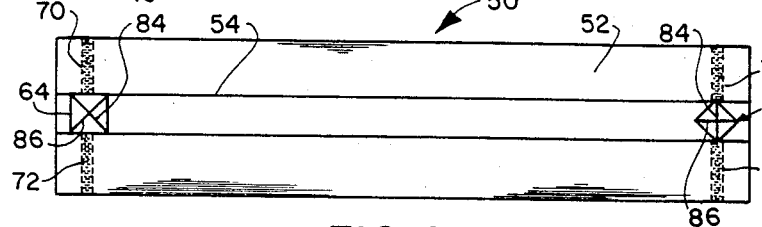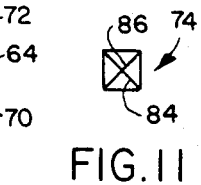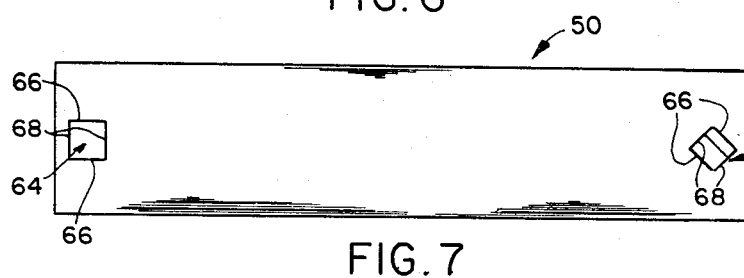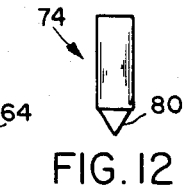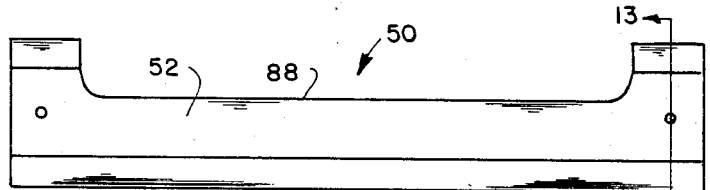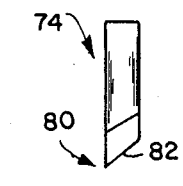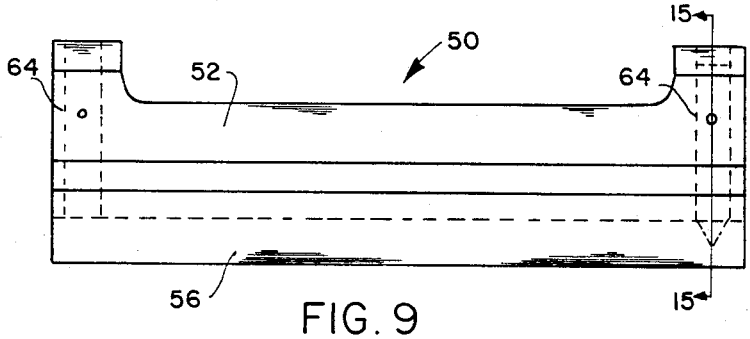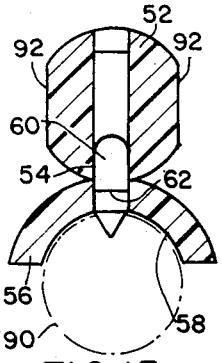

SPLITTER FOR ELECTRICAL CABLE

CROSS-REFERENCE TO RELATED APPLICATIONS

This application is a divisional application of my prior application, application Ser. No. 368,272 filed Apr. 14, 1982 now U.S. Pat. No. 4,459,745 issued July 17, 1984 which in turn is a continuation-in-part application of Ser. No. 271,942 filed June 9, 1981, now abandoned. All matter set forth in patent applications Ser. No. 271,942 and Ser. No. 368,272 is hereby incorporated by reference into the present application.

BACKGROUND OF THE INVENTION

1. Field of the invention

This invention relates to cable splitters for splitting the outside sheath of a cable. More particularly, this invention relates to cable splitters for splitting the outside sheath of a cable along the edge thereof.

2. Description of the Prior Art

Presently there exists many types of tools designed to cut the outside sheath of a cable. These tools typically comprise cable splitters or slitters designed to cut the outside sheath of a cable along the middle portion thereof. U.S. Pat. Nos. 2,089,528, 3,703,035 and 3,722,092 illustrate typical cable splitting tools having a combination of cams, levers and rollers. Usually the devices are designed to enable the cable to roll on the rollers past a cutting device operatively moved to a cutting position by means of a cam or lever. Each of these devices are substantially complex and require a considerable amount of care and maintenance during use. For these reasons, these types of cable splitters have not been widely accepted in the electrician trade.

U.S. Pat. No. 2,761,211, Canadian Pat. No. 460,344 and French Pat. No. 1,261,360 each disclose a cable slitter having a tube member for receiving the cable to be slit. In both the Canadian and French patents, the cutting element is connected to a pivotable lever to enable the cutting element to extend through an opening to engage the cable whereas the cutting element in the U.S. patent is operatively connected to a thumbscrew which adjusts the depth of the cutting element into the lumen of the tube. It should be appreciated that in each of these devices a number of component parts are required to accurately control the amount by which the cutting element cuts the outside sheath of the cable. Furthermore, as mentioned previously, such a multiplicity of component parts increases the cost of manufacture of these cable splitters and requires an undue amount of maintenance for proper operation of the cable splitter.

Therefore it is an object of this invention to provide an apparatus which overcomes the aforementioned inadequacies of the prior art devices and provides an improvement which is a significant contribution to the advancement of the cable splitter art.

Another object of this invention is to provide a cable splitter which is economical to manufacture.

Another object of this invention is to provide a cable splitter having no cams, rollers or levers which require an undue amount of maintenance and care for proper operation of the cable splitter.

Another object of this invention is to provide a cable splitter having a trough disposed along an elongated body for receiving the cable to be slit.

Another object of this invention is to provide a cable splitter having a cutting element which is adjustable to regulate the depth of the cut as the outer sheath of the cable is slit.

Another object of this invention is to provide a cable splitter wherein the trough protects the cutting edge of the cutting element to prevent accidental harm to the electrician.

Another object of this invention is to provide a cable splitter wherein the trough comprises a cross-sectional configuration which is substantially identical to the cross-sectional configuration of the cable to enable the cable to be cut along the edge thereof.

Another object of the present invention is the provision of a cable splitter having an attachment which facilitates the splitting of the sheath of cables of relatively large size.

Another object of the invention is the provision of a cable splitter having an attachment which is readily connectible to the first elongated member by means of a beading strip disposed on the second elongated member and in which the beading strip cooperates with a trough disposed on the first elongated member.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a cable splitter for cutting the outside sheath of an electrical cable to enable an electrician to gain access to the electrical conductors contained within the cable More particularly, the cable splitter of the invention comprises an elongated member having a trough disposed along its length. A handle is connected to the distal end of the elongated member. A cutting element is positioned through a boss connected to the proximal end of the elongated member such that the cutting edge of the cutting element extends into the bottommost portion of the trough. To cut the outer sheath of the cable, the cable is seated within the trough and then drawn therethrough such that the cutting edge of the cutting element cuts the outside sheath of the cable.

In an alternative embodiment of the present invention, a cable splitter for cutting the outside sheath of an electrical cable comprises a first elongated member having a first rough located along the longitudinal length of the first member. A second elongated member having a second trough is connected to the first elongated member by means of a beading strip attached to the second member. The beading strip cooperates with the first trough and a transverse channel extends through the first and second elongated members and intervening beading strip. A cutting element is adjustable located within the channel such that a cutting edge of the element is disposed within the second trough for cutting the outside sheath of an electrical cable of relatively large size. With the second elongated element detached from the first elongated member, a cable of relatively smaller size can be disposed within the first trough so that the sheath of the cable can be split.

An important feature of the cable splitter of the invention is the fact that the cable splitter comprises an integral design having no moving component parts. The simple design of the cable splitter may therefore be economically manufactured for sale to electricians. Moreover, the lack of any moving component parts substantially increases the durability of the cable splitter of the invention. The only component of the cable splitter which may require replacement after continued use is the cutting element. When the cutting element is manufactured from a hardened material, and should the cutting edge of the cutting element become dull after continued use, the cutting element may be easily removed from the boss, sharpened and then reinstalled in the boss.

Another feature of the invention is the trough located along the longitudinal length of the elongated member. Preferably, the trough extends along the entire longitudinal length of the elongated member from the distal to the proximal end thereof. Furthermore, the trough preferably comprises a cross-sectional configuration which is substantially identical to the cross-sectional configuration of the cable to be stripped. For example, when the cable splitter of the invention is used to split the outside sheath of a Romex cable, the trough preferably comprises a substantially U-shaped configuration for receiving the Romex cable edgewise therein. As the Romex cable is drawn through the trough, the cutting element cuts the outer sheath of the Romex cable along the edge thereof. This allows the sheath to be peeled away from the inner conductors in a manner substantially easier than if the sheath was cut along the flat side of the cable. The trough also serves to protect the cutting edge of the cutting element to prevent accidental harm to the electrician.

Another feature of the alternative embodiment of the invention is the ease with which the second elongated member can be attached to the first elongated member so as to provide a cable splitter which can be used to split the outside sheath of a relatively massive cable.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 5 is a side view of a first elongated member of an alternative embodiment of the present invention;

FIG. 6 is a bottom plan view of the first elongated member of FIG. 5;

FIG. 7 is a top plan view of the first elongated member of FIG. 5;

FIG. 8 is a side view of a further modification of the alternative embodiment of FIG. 5 showing a top recess and flattened side portions;

FIG. 9 is a side view of the first elongated member shown in FIG. 8 connected to a second elongated member;

FIG. 10 is a cross-sectional view taken on the line 10—10 of FIG. 5;

FIG. 11 is a bottom plan view of a cutting element;

FIG. 12 is a side view of the cutting element of FIG. 11;

FIG. 13 is a side view of an alternative cutting element;

FIG. 14 is a bottom plan view of the alternative cutting element of FIG. 13; and FIG. 15 is a cross-sectional view taken on line 15—15 of FIG. 9.

Similar reference characters refer to similar parts throughout the several views of the drawings.

DETAILED DESCRIPTION

Figure 1:
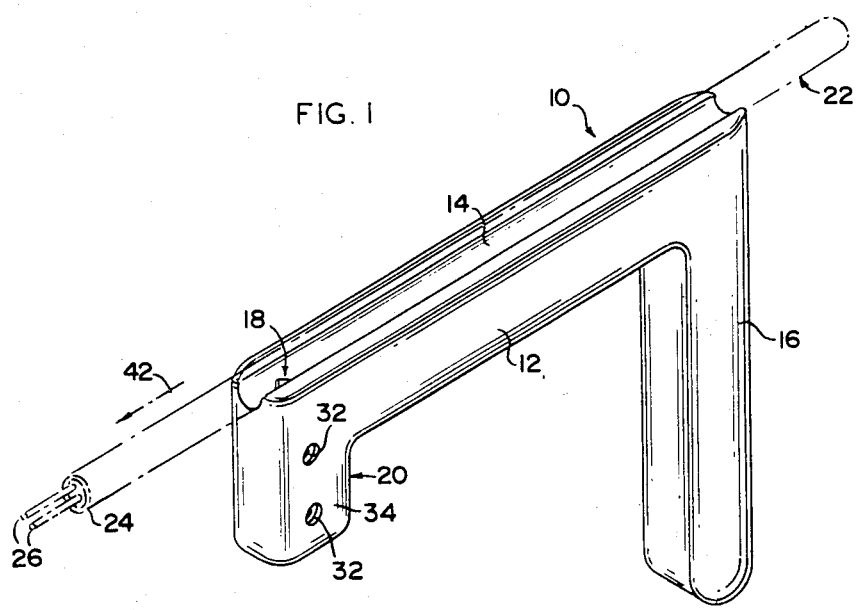
FIG. 1 is a perspective view of the cable splitter of the invention.

FIG. 1 is a perspective view of the cable splitter 10 of the invention. The cable splitter 10 comprises an elongated member 12 having a trough 14 disposed along its length. A handle 16 is connected to the distal end of the elongated member 12. A cutting element 18 is positioned through a boss 20 connected to the proximal end of the elongated member 12 such that the cutting element 18 extends into the trough 14. As a cable, generally represented by the numberal 22, is pulled through the trough 14, the cutting element 18 cuts the outer sheath 24 of the cable 22 to enable the electrician to gain access to the electrical conductors 26 contained within the cable 22.

More particularly, the trough 14 disposed within the elongated member 12 extends along the entire length of the elongated member 12 from the proximal to the distal end thereof. Preferably, trough 14 extends into the elongated member 12 at a depth substantially equal to at least half of the diameter of the cable 22 to be stripped. This assures that the cable 22 will be securely seated within the trough 14 during the stripping procedure. Furthermore, the cross-sectional configuration of the trough 14 is preferably substantially identical to the cross-sectional configuration of the cable 22. For example, when using the cable splitter 10 of the invention to cut the outer sheath 24 of a Romex cable 22, the cross-sectional configuration of the trough 14 is preferably U-shaped thereby enabling the cable 22 to seat edgewise within the trough 14. Accordingly, as the cable 22 is drawn through the trough, the cutting element cuts the outer sheath 24 of the cable 22 along the edge thereof.

Figure 2:
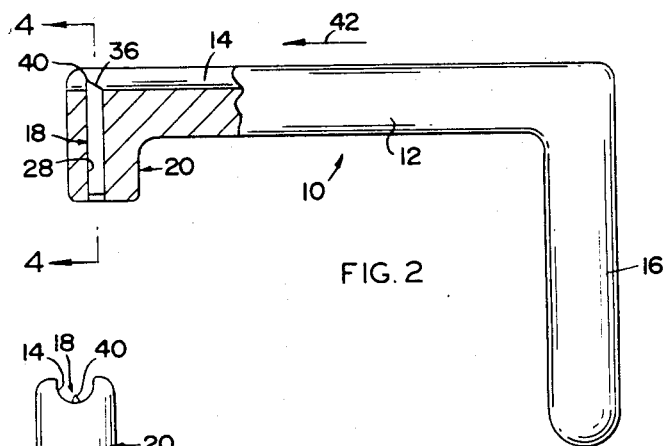
FIG. 2 is a side elevational view of the cable splitter of the invention.
Figure 3:
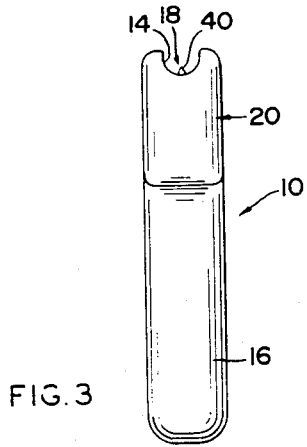
FIG. 3 is a frontal view of the cable splitter of the invention.
Figure 4:
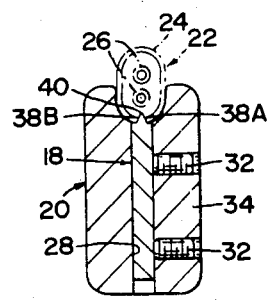
FIG. 4 is a cross-sectional view of FIG. 2 along lines 4—4 showing the cutting edge of the cutting element cutting the outer sheath of a cable.

As shown in FIGS. 2, 3 and 4, the cutting element 18 is positioned through an aperture 28 located within the boss 20 connected to the proximal end of the cable splitter 10. More specifically, aperture 28 is preferably centered within boss 20 to enable the cutting element 18 to extend into the bottommost portion of the trough 14. A pair of threaded fasteners such as set screws 32 are threadably disposed through the side of the boss 30 to engage the cutting element 18 located within aperture 28. As shown in FIG. 4, the set screws 32 allow the cutting element 18 to be easily adjusted within aperture 28. Accordingly, the depth of the cut made into the cable 22 by the cutting element 18 may be easily and adjustably regulated by means of such set screws 32. As noted earlier, the cutting element 18 preferably extends into the trough 14 only a distance sufficient to cut the outer sheath 24 of the cable 22.

The cutting element 18 is specially designed to easily cut through the outer sheath 24 of the cable 22. Specifically, the cutting edge 36 of the cutting element 18 is formed by two flat angled surfaces 38A and 38B which extend downwardly from the point 40 of the cutting element 18 thereby forming the cutting edge 36. Preferably, the cutting element 18 is positioned within aperture 28 of the boss 20 such that the cutting edge 36 cuts the outer sheath 24 of the cable 22 as the cable 22 is drawn through the trough 14 in the direction shown by arrow 42.

As noted earlier, handle 16 is connected to the distal end of the elongated member 12. Preferably, handle 16 extends from the elongated member 12 in a right angle relationship thereto. Furthermore, handle 16 preferably comprises a substantially square cross-section having the corners thereof rounded to provide a comfortable grip for the electrician. It should be understood however, that handle 16 may comprise many other different types of cross-sectional configurations and may extend from the elongated member 12 at an obtuse angle.

It should be appreciated that the cable splitter 10 of the invention comprises an integral unit which may be easily manufactured from many types of materials such as synthetic plastics. Accordingly, such a unitary structure of the cable splitter 10 is substantially more economical to manufacture than other prior art cable splitters. Moreover, the cable splitter 10 of this invention is a substantial improvement over the prior art cable splitters in that the cable splitter 10 of this invention comprises a simplistic design having no moving parts such as cams and rollers which require a substantial amount of care and maintenance for proper operation of the cable splitter. In striking contrast thereto, the only component part of the cable splitter 10 of this invention which may require replacing after continued use is the cutting element 18. However, assuming the cutting element 18 is hardened by conventional metal tempering techniques, the cutting element 18 will need to be replaced or sharpened only after a substantial amount of use.

Although the cable splitter 10 of this invention has been described in detail as being used to cut the outer sheath 24 of a cable 22, it should be understood that the trough 14 disposed within the elongated member 12 of the cable splitter 10 may be easily modified to accept many other types of cables containing a multiplicity of inner conductors. Alternatively, the trough 14 may be dimensioned to receive a single insulated conductor such as a wire to enable the cable splitter 10 to be used to cut the insulation from the insulated conductor. Accordingly, it shall be understood that the word "cable splitter" used in the above discussion and the appended claims shall mean and include an apparatus for splitting the outer sheath 24 of the cable 22 or for splitting the insulation from an insulated wire.

Referring to the alternative embodiment of the present invention as shown in FIGS. 5 to 15, a cable splitter 50 includes a first elongated member 52 having a first trough 54. A second elongated member 56 has a second trough 58 extending along the longitudinal length thereof. A beading strip 60 is either molded integrally with the second elongated meber 56 or is disposed within a longitudinal groove 62 provided in the second elongated member 56.

A transverse channel 64 extends at right angles to the longitudinal axis of the first elongated member through the first elongated member 52 and second elongated member 56 and through the intervening beading strip 60. The transverse channel 64 which is square in transverse cross-section has opposing walls 66 and 68 respectively as shown in FIG. 7. These walls 66 and 68 are disposed parallel to and at right angles to the longitudinal axis of the first elongated member respectively. Alternatively, the opposite side walls 66 and 68 respectively, may be disposed at an angle of forty-five degrees to the longitudinal axis of the first elongated member as shown in the righthand transverse channel 64 of FIG. 7.

As shown in FIG. 6, a cutting element 74 is disposed within the lefthand transverse channel 64 so that the first and second cutting edges 84 and 86 respectively, are disposed at an angle of forty-five degrees relative to the longitudinal axis of the first elongated member 52.

Also, as shown in FIG. 6, a cutting element 74 is disposed within the righthand transverse channel 64 so that the first and the second cutting edges 84 and 86 respectively, are disposed at right angles and parallel to the longitudinal axis of the first elongated member.

An alternative cutting element 74 is shown in FIGS. 13 and 14 having a square transverse cross-section. The cutting means generally designated 80 includes a single knife edge 82 so that when the cutting element 74 is located within the lefthand transverse channel 64 as viewed in FIG. 7, the knife edge 72 is disposed parallel to the longitudinal axis of the first elongated member 52.

As shown particularly in FIGS. 8 and 15, a recess 88 is defined by the first elongated member. The recess 88 extends along a portion of the longitudinal length of the first elongated member 52. The member 52 also has flattened side portions 92 which facilitate the gripping of the member 52.

In use of the cable splitter, a cable 90 of relatively small size is located adjacent the first trough 54 as shown in FIG. 5. The cable 90 is pressed upwardly against the cutting means 80 of the cutting element 74 such that the cutting means pierces the outer sheath of the cable. The cable 90 is pulled longitudinally past the cutting means to split the sheath from the inner conductors.

If the cable splitter is to be used to split the sheath of a relatively large cable, the second elongated member 56 is connected to the first elongated member 52 by locating the beading strip 60 within the first trough 54. The relatively large cable 90 as shown in FIG. 15 is then pressed upwardly against the cutting means 80 of the cutting element 74 such that the outer sheath of the cable is pierced. The cable is then pulled longitudinally along the second trough 58 past the cutting means to split the sheath from the inner conductors.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A method of splitting the outside sheath of an electrical cable comprising the steps of:

inserting a beading strip within a first trough of a first elongated member;

inserting the edge of the beading strip protruding from the first trough of the first elongated member within a longitudinal groove defined by a second elongated member such that the first and the second member are connected together by the interaction of the beading strip with the first trough and the longitudinal groove respectively;

adjusting the location of a cutting element within a transverse channel defined by the elongated members such that the cutting edge of the cutting element is disposed within a second trough of the second elongated member;

pressing the cable against the cutting edge of the cutting element such that the cutting edge pierces the outside sheath of the cable; and pulling the cable longitudinally past the cutting means to split the sheath from the inner conductors.

* * * * *

UNITED STATES PATENT AND TRADEMARK OFFICE
CERTIFICATE OF CORRECTION

PATENT NO. : 4,536,957
DATED : August 27, 1985
INVENTOR(S) : Walter Britton

It is certified that error appears in the above-identified patent and that said Letters Patent are hereby corrected as shown below:

At column 6, line 12, delete "meber" and insert therefore --member--.

Claim 1, column 8, line 3, delete "member" and insert therefore --members--.

Signed and Sealed this

Nineteenth Day of November 1985

[SEAL]

Attest:

DONALD J. QUIGG

Attesting Officer

Commissioner of Patents and Trademarks